United States Patent
Rogers et al.

(10) Patent No.: US 10,239,267 B2
(45) Date of Patent: Mar. 26, 2019

(54) PROCESS FOR PRODUCING INJECTION STRETCH BLOW MOLDED POLYOLEFIN CONTAINERS

(75) Inventors: Mike Rogers, Macclesfield (GB); Anja Gottschalk, Buedingen (GB)

(73) Assignee: Basell Poliolefine Italia S.r.l., Milan (IT)

( * ) Notice: Subject to any disclaimer, the term of this patent is extended or adjusted under 35 U.S.C. 154(b) by 704 days.

(21) Appl. No.: 13/881,282

(22) PCT Filed: Oct. 20, 2011

(86) PCT No.: PCT/EP2011/068295
§ 371 (c)(1),
(2), (4) Date: Apr. 24, 2013

(87) PCT Pub. No.: WO2012/055742
PCT Pub. Date: May 3, 2012

(65) Prior Publication Data
US 2013/0214460 A1 Aug. 22, 2013

Related U.S. Application Data

(60) Provisional application No. 61/407,160, filed on Oct. 27, 2010.

(30) Foreign Application Priority Data

Oct. 26, 2010 (EP) .................... 10188824

(51) Int. Cl.
| | |
|---|---|
| *B29C 49/06* | (2006.01) |
| *B29D 22/00* | (2006.01) |
| *B29C 49/00* | (2006.01) |
| *B29C 49/12* | (2006.01) |
| *B29C 49/02* | (2006.01) |
| *B29K 23/00* | (2006.01) |
| *B29K 105/00* | (2006.01) |

(52) U.S. Cl.
CPC ........ *B29D 22/003* (2013.01); *B29C 49/0005* (2013.01); *B29C 49/06* (2013.01); *B29C 49/12* (2013.01); *B29C 2049/001* (2013.01); *B29C 2049/024* (2013.01); *B29K 2023/04* (2013.01); *B29K 2023/06* (2013.01); *B29K 2023/08* (2013.01); *B29K 2023/12* (2013.01); *B29K 2023/14* (2013.01); *B29K 2105/005* (2013.01)

(58) Field of Classification Search
None
See application file for complete search history.

(56) References Cited

U.S. PATENT DOCUMENTS

| | | | |
|---|---|---|---|
| 2003/0109667 A1* | 6/2003 | Fujimori et al. | 528/272 |
| 2004/0180159 A1* | 9/2004 | Neal et al. | 428/35.7 |
| 2007/0238056 A1 | 10/2007 | Baumann et al. | |
| 2009/0057961 A1 | 3/2009 | McKeeman et al. | |
| 2009/0292048 A1* | 11/2009 | Li et al. | 524/115 |
| 2009/0304969 A1* | 12/2009 | Fujikawa | B29C 49/12 |
| | | | 428/36.92 |
| 2011/0217500 A1 | 9/2011 | Gottschalk et al. | |
| 2012/0082834 A1 | 4/2012 | Wermter et al. | |

FOREIGN PATENT DOCUMENTS

CN 1976799 A 6/2007

OTHER PUBLICATIONS

PCT International Search Report & Written Opinion dated Nov. 7, 2012, for PCT/EP2011/068295.

* cited by examiner

*Primary Examiner* — Jacob T Minskey

(57) ABSTRACT

Injection stretch blow molding process for preparing polyolefin containers, comprising the following steps: 1) preparing a preform by injection molding a polyolefin composition comprising a polymer (A) selected from ethylene polymers, propylene polymers and mixtures thereof, and a heat absorber (B); 2) supplying heat to reheat the preform prepared in step 1) and stretch blow molding said preform; wherein the heat absorber (B) is selected from phosphates, condensed phosphates, phosphites, and mixed hydroxide/phosphate oxanion compounds of Copper (Cu), Calcium (Ca), Tin (Sn) and/or Iron (Fe).

10 Claims, No Drawings

PROCESS FOR PRODUCING INJECTION STRETCH BLOW MOLDED POLYOLEFIN CONTAINERS

This application is the U.S. National Phase of PCT International Application PCT/EP2011/068295, filed Oct. 20, 2011, claiming priority of European Patent Application No. 10188824.6, filed Oct. 26, 2010 and the benefit under 35 U.S.C. 119(e) of U.S. Provisional Application No. 61/407,160 filed Oct. 27, 2010, the contents of which are incorporated herein by reference in their entirety.

The present invention relates to a stretch blow molding process including the use of a radiation absorbent material as reheat additive to enable heat, generally induced by infra-red rays, to penetrate more evenly and more quickly into the surface of containers made from polyolefins.

Injection stretch blow-molding processes, both single- and two-step, are commonly used in the art for the production of containers made of thermoplastic polymer materials, particularly polyethylene terephthalate (PET).

Such processes are generally carried out by first preparing a preform by injection molding, which preform is then subjected to stretch blow molding. In the two-step process, the preforms are reheated in order to carry out the stretch blow molding step.

With polyolefins however, due to their poor thermal conductivity, there is a problem with the slow transmission of heat during the reheating process from the outside of the preform wall to the inside of the preform. The result is that the inside temperature of the preform can differ by several degrees from the outside temperature. This problem manifests itself in that it is difficult to control the wall thickness distribution of the containers, which may, depending upon the complexity of design, result in higher levels of scrap than is desirable. The wall thickness can be measured and compared in terms of tolerance at several points on the container. More importantly, the Top-Load of the finished containers (bottles in particular) improves with better wall thickness distribution. This enables manufacturers to reduce the necessary weight of the preform, with the cost and energy savings associated with it.

Thus in order to favour heat transmission inside the preform, it has been proposed to add heat absorbents in the polyolefin materials used to prepare the preforms.

In particular, WO2004083294 and WO2006018777 relate to use of various infrared heat absorbents in the stretch blow molding of polypropylene.

Such documents show that carbon black is a useful heat absorbent, but, as explained in WO2006018777, it has the disadvantage of easily imparting a dark coloration to the final articles. Other heat absorbent materials disclosed in said documents are metal particles, graphite, infra-red absorbing dyes.

In the said WO2006018777 it is also explained that an important disadvantage of polypropylene with respect to PET is of exhibiting a very narrow processing window.

It has now been found that by using specific metal compounds as heat absorbents, it is possible to obtain injection stretch blow molded polyolefin containers, in particular bottles, without appreciably worsening their coloration and with a remarkably reduced wall thickness distribution. The improvement in tolerance on wall thickness distribution is shown to be between 50 and 100% across the bottle. This better wall thickness distribution manifests itself in higher topload for the bottles of between 20 and 40%, which in turn gives customers significant potential to downgauge the bottles, whilst retaining the same topload. A further added benefit is a significant reduction in scrap rate, thereby reducing cost of production.

Moreover a significant energy reduction above 20%, for propylene polymer-based bottles and almost 10% for ethylene polymer-based bottles, is achieved in the reheating step of the injection stretch blow molding process, and the processing window, which is the range of temperatures over which satisfactory bottles can be produced, is remarkably enlarged.

The said metal compounds are described in WO2010100153, wherein their suitability as reheating agents is mentioned, but without disclosing the specific and unexpected advantages achievable by using them in polyolefin stretch blow molding.

Thus the present invention provides an injection stretch blow molding process for preparing polyolefin containers, comprising the following steps:

1) preparing a preform by injection molding a polyolefin composition comprising a polymer (A) selected from ethylene polymers, propylene polymers and mixtures thereof, and a heat absorber (B);
2) supplying heat to reheat the preform prepared in step 1) and stretch blow molding said preform;

wherein the heat absorber (B) is selected from phosphates, condensed phosphates, phosphites, and mixed hydroxide/phosphate oxanion compounds (namely salts) of Copper (Cu), Calcium (Ca), Tin (Sn) and/or Iron (Fe).

Such heat absorber (B) is generally present in the polymer matrix in a finely distributed, dispersed, or dissolved form.

Preferred amounts of heat absorber (B) are from 250 to 1000 ppm, most preferred are from 400 to 600 ppm by weight with respect to the sum of (A) and (B).

Examples of the said mixed hydroxide/phosphate oxanion compounds are the hydroxide phosphates. Copper hydroxide phosphates are preferred.

Specific examples of heat absorber (B) are:
dicopper hydroxide phosphate $Cu_2(OH)PO_4$, (CAS No. 12158-74-6) sold by Budenheim with the trademark Budit LM16; copper pyrophosphate (CAS No. 10102-90-6); copper phosphate $Cu_3P_2O_8$, (CAS No. 7798-23-4).

The heat absorber (B) is generally able to absorb infrared (IR) radiation, namely radiation with wavelength indicatively between 700 and 25,000 nm.

The polymer (A) is selected from propylene or ethylene homopolymers or copolymers or compositions (mixtures) of the same.

Among the said propylene homopolymers or copolymers, preferred are propylene copolymers containing one or more comonomers selected from ethylene and $C_4$-$C_{10}$ α-olefins, represented by the formula $CH_2=CHR$, wherein R is an alkyl radical, linear or branched, with 2-8 carbon atoms or an aryl (in particular phenyl) radical.

Examples of said $C_4$-$C_{10}$ α-olefins are 1-butene, 1-pentene, 1-hexene, 4-methyl-1-pentene and 1-octene. Particularly preferred are ethylene and 1-butene.

Preferred features for the said propylene homopolymers or copolymers are:
  isotacticity index: equal to or higher than 80%,
  amount of comomomer(s) in the copolymers equal to or lower than 22% by weight, more preferably equal to or lower than 8% by weight, the lower limit being in particular of 0.3% by weight;
  MFR L (Melt Flow Rate according to ASTM D 1238, condition L, i.e. 230° C. and 2.16 kg load) from 0.5 to 50, more preferably from 1 to 40 g/10 min.;
  Polydispersity Index (PI), measured as specified below: from 3 to 6, more preferably from 3 to 5;

a Flexural Modulus of 500 MPa or higher, more preferably of 900 MPa or higher, most preferably of 1400 MPa or higher (measured according to ISO 178);
fraction extractable in hexane (FDA 177, 1520): less than 5%, more preferably less than 3% by weight;
fraction soluble in xylene at room temperature (measured as specified below): less than 25%, more preferably less than 10%.

Determination of Polydispersity Index

Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

Determination Solubility in Xylene at Room Temperature (25° C.) in % by Weight for Propylene Polymers 2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Preferred kinds of copolymers are random copolymers containing such an amount of comonomer(s) as to have a melting temperature (measured by DSC) of 130° C. or higher, more preferably of 140° C. or higher, determined by DSC according ISO 11357, part 3 with a heating rate of 20° C. per minute. When only ethylene is present as the comonomer, it is generally within 0.8 and 6% by weight with respect to the weight of the polymer. When $C_4$-$C_{10}$ α-olefins are present, they are generally within 1 and 10% by weight with respect to the weight of the polymer.

Propylene polymer compositions particularly suited for the preparation of injection stretch blow-molded containers comprise:

a$^I$) 25 wt % to 75 wt %, preferably 35 wt % to 65 wt % of a homopolymer or random copolymer of propylene containing up to 2.0 wt % of at least one comonomer selected from ethylene and $C_4$-$C_{10}$ α-olefins, preferably having an isotactic index greater than 80%, more preferably from 90% to 99.5%; and a$^{II}$) 25 wt % to 75%, preferably 35 wt % to 65 wt % of a random copolymer of propylene and at least one comonomer selected from ethylene and $C_4$-$C_{10}$ α-olefins, containing 0.3 to 30 wt % of said olefin, preferably 0.3 to 20 wt %, more preferably 0.3 to 6%, the comonomer content being different from the comonomer content of the random copolymer a$^I$), preferably at least 1 wt % greater than the comonomer content of the random copolymer a$^I$), and preferably having an isotactic index greater than 60%, more preferably greater than 70%, most preferably equal to or greater than 80%;

wherein the overall propylene polymer composition preferably has a MFR of 1 to 50 g/10 min., more preferably from 2 to 40 g/10 min., measured according to ASTM D 1238, condition L.

The expression "wt %" means percent by weight and is referred to the sum of a$^I$) and a$^{II}$). The said propylene (co)polymers belong to the family of the (co)polymers that can be obtained by way of polymerization processes in the presence of coordination catalysts. Said processes and the (co)polymers obtained from them are widely described in the art.

In particular it is possible to carry out the polymerization process in the presence of a Ziegler-Natta catalyst.

As is well known, the Ziegler-Natta polymerization catalysts comprise the reaction product of an organic compound of a metal of Groups I-III of the Periodic Table (for example, an aluminum alkyl), and an inorganic compound of a transition metal of Groups IV-VIII of the Periodic Table (for example, a titanium halide), preferably supported on a Mg halide. The polymerization conditions to be used with such catalysts generally are well known also.

For example one can use the high yield and highly stereospecific Ziegler-Natta catalysts and the polymerization processes described in U.S. Pat. No. 4,399,054, EP-A-45977, EP-A-361493 and EP-A-728769, WO0063261, WO0230998, WO02057342 and WO02051912. Other suitable coordination catalysts that can be used in polymerization to prepare the said propylene (co)polymers are the metallocene catalysts.

The said polymerization catalysts comprise the reaction product of a metallocene and a compound such as an alumoxane, trialkyl aluminum or an ionic activator. A metallocene is a compound with at least one cyclopentadienyl moiety in combination with a transition metal of Groups IV-VIII of the Periodic Table.

For example one can use the metallocene catalysts described in WO 01/48034 and WO 03/045964.

When the propylene polymer (A) is a propylene polymer composition, such polymer can be prepared by polymerizing the monomers in two or more consecutive or parallel stages. The polymerization can be carried out in any known manner in bulk, in suspension, in the gas phase or in a supercritical medium. It can be carried out batchwise or preferably continuously. Solution processes, suspension processes, stirred gas-phase processes or gas-phase fluidized-bed processes are possible. As solvents or suspension media, it is possible to use inert hydrocarbons, for example isobutane, or the monomers themselves.

The above mentioned MFR values can be obtained directly in polymerization by adequately adjusting the molecular weight regulating agent (such as hydrogen, for example), or can be achieved by way of a visbreaking process to which the propylene (co)polymers are subjected. The visbreaking process of the polymer chains is carried out by using the appropriate techniques. One of said techniques is based on the use of peroxides which are added to the (co)polymer in a quantity that allows one to obtain the desired degree of visbreaking.

The peroxides that are most conveniently employable for the visbreaking process have a decomposition temperature preferably ranging from 150 to 250° C. Examples of said peroxides are the di-tert-butyl peroxide, the dicumyl peroxide, the 2,5-dimethyl-2,5-di(tert-butyl peroxy)hexyne, and the 2,5-dimethyl-2,5-di(tert-butyl peroxy)hexane, which is marketed under the Luperox 101 trade name.

The quantity of peroxide needed for the visbreaking process preferably ranges from 0.05% to 1% by weight of the (co)polymer.

Among the ethylene homopolymers or copolymers, preferred are the so called high density polyethylenes (HDPE). Particularly preferred are said ethylene homopolymers or copolymers having density equal to or greater than 0.945 g/cm$^3$, in particular from 0.945 g/cm$^3$ to 0.960 g/cm$^3$ (measured according to ISO 1183). Preferably the said ethylene homopolymers or copolymers have F/E ratio values equal to or greater than 60, in particular from 60 to 100 (measured according to ISO 1133).

The ethylene copolymers typically contain $C_4$-$C_{10}$ α-olefins, preferably in amounts up to 10% by weight, like in particular 1-butene, 1-pentene, 1-hexene, 4-methyl-1-pentene and 1-octene, and their mixtures.

The F/E ratio is the ratio between the Melt Flow Rate measured at 190° C. with a load of 21.6 kg (also called condition F) and the Melt Flow Rate measured at 190° C. with a load of 2.16 kg (also called condition E).

Preferred values of Melt Flow Rate E are of 0.1 g/10 min. or more, most preferred are of 0.5 g/10 min. or more, in particular from 0.1 or 0.5 to 10 g/10 min.

Other additives used in the said (co)polymers can include, but are not limited to phenolic antioxidants, phosphite-series additives, anti-static agents and acid scavengers, such as sodium stearate, calcium stearate and hydrotalcite.

Generally, in the process of the invention the said preform is obtained by injecting the molten polymer in the appropriate molds, using processes and equipments well known in the art.

The temperature at which the polymer material is injected to obtain the preform should be selected by those skilled in the art depending on the particular polymer composition used.

Preferably the injection temperature is from 210 to 260° C.

Typically the injection pressure is from 25 to 80 MPa (250 to 800 bar).

The mold used in such process step can be any conventional mold used to make preforms in injection stretch blow-molding equipments.

Step 1) may be carried out in a first piece of equipment, and subsequently the obtained preforms are routed to a second piece of equipment for the reheating and stretch blow-molding step 2). The preforms can be allowed to cool to 25° C. (preform temperature) before stretch blow molding. For the stretch blow molding step 2) the preforms are re-heated also to a typical preform temperature from 115 to 138° C., measured on both the inside and outside surfaces of the preforms.

More preferably, the preform temperature is of from 120 to 135° C. measured on both the inside and outside surfaces of the preforms.

An infrared heating source (in particular infrared lamps) is typically used, but one skilled in the art would recognize that any heat source consistent with the properties of the polymer composition may be used. The preforms are typically conveyed along a bank of heating units while being rotated to evenly distribute the heat. The preforms may also be contacted with cooling air during and after heating to minimize overheating of the preform surface. Once the pre-heated preforms exit the heating oven, the preforms are transferred to a blow mold.

Generally, to carry out stretch blow molding in process step 2), a stretch rod is inserted into the preform to stretch and guide the preform centrally in the axial direction. Pressurized gas (preferably air) at 0.1 to 4 MPa (1 to 40 bar), preferably 0.4 to 2 MPa (4 to 20 bar) is introduced to complete the blow molding of the finished container or bottle. Optionally, the pressurized gas can be introduced in two steps, where a pre-blow is performed by introducing pressurized gas at 0.1 to 2 MPa (1 to 20 bar), preferably 0.4 to 1.2 MPa (4 to 12 bar), followed by the final blow molding at the higher pressures described above.

The stretch ratio is preferably from 2 to 4.

As previously said, the process of the present invention allows one to obtain polymer containers having high physical-mechanical properties.

In particular, it allows to obtain containers, specifically bottles, having a high impact resistance and rather low Haze values, preferably of 50% or less.

Also the energy efficiency of the reheating process can be recorded on the reheating machine, giving an indication of energy saving.

The following examples, demonstrating the effect of using the additive in the way described above, are relating to the preparation of injection stretch-blow molded bottles and are given for illustrating but not limiting purposes.

EXAMPLES 1 AND 2 AND COMPARISON EXAMPLES 1 AND 2

Two types of 1000 ml bottles are prepared, using a laboratory-scale, two-step injection stretch blow molding equipment.

Type 1 is prepared by using an ethylene polymer having density (ISO 1183) of 0.954 g/cm$^3$, Melt Flow Rate E of 1.45 g/10 min. and F/E ratio of 87.5, sold by Lyondellbasell with trademark Hostalen ACP 6541 A UV.

Type 2 is prepared by using a propylene polymer composition containing 50 wt % of a propylene random copolymer a$^I$) having an ethylene content of 1 wt %, and 50 wt % of a propylene random copolymer a$^{II}$) having an ethylene content of 2.3 wt %. The total composition has Melt Flow Rate of 12 g/10 min. (ASTM D 1238, 230° C., 2.16 kg). Such composition was prepared by first prepolymerizing with propylene a high-yield, high-stereospecificity Ziegler Natta catalyst supported on magnesium dichloride. The pre-polymerized catalyst and propylene were then continuously fed into a first loop reactor. The homopolymer formed in the first loop reactor and ethylene were fed to a second loop reactor. The temperature of both loop reactors was 72° C. The polymer was discharged from the second reactor, separated from the unreacted monomers and dried.

Before preparing the performs, the polymers used in Examples 1 and 2 are melt-mixed, in a conventional extrusion apparatus, with 500 ppm by weight (referred to the total weight) of $Cu_2(OH)PO_4$ (Budit LM16). In the polymers used in Comparison Examples 1 and 2 no heat absorbent is added.

The process conditions are reported in Table 1, and the characteristics of the so obtained bottles are reported in Table 2. Between process step 1) and process step 2), the preforms are left to cool to 25° C. (preform temperature).

The reheating in process step 2) is carried out by passing the preforms in front of IR lamps.

TABLE 1

| | Example No. | | | |
|---|---|---|---|---|
| | Comparison 1 | 1 | Comparison 2 | 2 |
| Bottle Type | 1 | 1 | 2 | 2 |
| PROCESS STEP 1) - PREFORM CHARACTERISTICS | | | | |
| Weight of preform (g) | 36.0 | 36.0 | 34.0 | 34.0 |
| Maximum thickness of preform (mm) | 3.7 | 3.7 | 3.7 | 3.7 |
| Height of preform (mm) | 124 | 124 | 124 | 124 |
| PREFORM MOLDING PARAMETERS | | | | |
| Injection temperature (° C.) | 250 | 240 | 240 | 240 |
| Mold temperature (° C.) | 15 | 15 | 35 | 35 |
| Injection time (seconds) | 2.01 | 3.98 | 4.99 | 5.59 |
| Injection pressure (MPa) | 74.6 | 57.0 | 32.9 | 29.3 |
| PROCESS STEP 2) - STRETCH-BLOW MOLDING PARAMETERS | | | | |
| Blow molding temperature (° C.) | 121 | 121 | 133 | 133 |
| Blow molding pressure (MPa) | 1.1 | 1.1 | 1.2 | 1.2 |
| Stretch Ratio | 2.49 | 2.49 | 2.49 | 2.49 |
| Preform Temperature Inside (° C.) [1] | 121 | 123 | 126 | 134 |
| Preform Temperature Outside (° C.) [1] | 124 | 126 | 131 | 134 |
| Infra-red Energy Reduction During Reheating (%) [2] | — | 9 | — | 29 |
| Energy Reduction (of Total SBM process) (%) | — | 4 | — | 12 |
| Process Window (° C.) | 1 | 3 | 2 | 8 |
| Widening of Process Window (%) | — | 200 | — | 400 |
| Scrap Rate % [3] | 14 | 1 | 10 | 2 |

TABLE 2

| | Example No. | | | |
|---|---|---|---|---|
| | Comparison 1 | 1 | Comparison 2 | 2 |
| BOTTLE CHARACTERISTICS | | | | |
| Haze (%) [4] | 62.6 | 73.1 | 2.3 | 7 |
| Drop test at 22° C. [5] (cm) | >200 | >200 | 190 | >200 |
| Drop test at 4° C. [5] (cm) | >200 | >200 | 60 | 48 |
| Topload (Filled) [6] | | | | |
| First Maximum load (N) | 684.7 | 953.3 | 408.67 | 505.2 |
| Strain at maximum load (mm) | 4.9 | 9.3 | 3.5 | 3.0 |
| Standard Deviation | 12.96 | 4.87 | 52.58 | 9.82 |
| Improvement In Filled Topload (%) | — | 39.0 | — | 23.6 |
| BOTTLE CHARACTERISTICS Average of 6 Wall Thicknesses (mm) | | | | |
| Heel | 0.373 | 0.393 | 0.475 | 0.387 |
| Lower Label | 0.336 | 0.508 | — | 0.496 |
| Middle Label | 0.451 | 0.429 | 0.621 | 0.447 |
| Upper Label | 0.363 | 0.432 | — | 0.531 |
| Shoulder | 0.595 | 0.407 | 0.396 | 0.452 |
| Upper Shoulder | 0.370 | 0.435 | 0.349 | 0.312 |
| Standard Deviation | | | | |
| Heel | 0.062 | 0.007 | 0.055 | 0.021 |
| Lower Label | 0.044 | 0.004 | — | 0.009 |
| Middle Label | 0.02 | 0.009 | 0.046 | 0.008 |
| Upper Label | 0.1 | 0.003 | — | 0.021 |
| Shoulder | 0.10 | 0.004 | 0.032 | 0.029 |
| Upper Shoulder | 0.078 | 0.006 | 0.031 | 0.020 |
| Average S. Dev. | 0.067 | 0.006 | 0.041 | 0.018 |
| Improvement in Wall Thickness Distribution Tolerance (%) | — | 91 | — | 56 |

Notes to Tables.
[1] Thermal Camera;
[2] Infra red Lamp Setting to Reach Satifactory Process Conditions;
[3] Precent of bottles with the evident defects;
[4] measured according to ASTM D1003;
[5] and [6] measured according to the "Voluntary Standard Test Methods For PET Bottles" issued in 2004 by International Society of Beverage Technologists 8110 South Suncoats Boulevard Homossa, FL 34446-5006, USA.

EXAMPLES 3 TO 5

Further trials were conducted using a commercial KHS-Corpoplast Blowmax machine with preferential heating specially designed for processing polyolefins, in order to prove that using the infra-red additive $Cu_2(OH)PO_4$ enables production of oval bottles with good wall thickness, which is difficult to achieve without the presence of the additive. The polyolefin used is an ethylene polymer having density (ISO 1183) of 0.950 g/cm$^3$, Melt Flow Rate E of 0.95 g/10 min. and F/E ratio of 37, containing 500 ppm of $Cu_2(OH)PO_4$.

The process conditions and the characteristics of the so obtained bottles are reported in Table 3.

Bottle Size

Example 3: bottle, oval, length 121 mm, ovality 1:1.6

Example 4: bottle, oval, length 200 mm, ovality 1:1.6

Example 5: round bottom bottle, round, length 243 mm, diameter 50 mm

TABLE 3

| Example No. | 3 | 4 | 5 |
|---|---|---|---|
| PREFORM CHARACTERISTICS | | | |
| Weight of preform (g) | 10.1 | 11.1 | 12.5 |
| Maximum thickness of preform (mm) | 2.15 | 2.15 | 2.15 |
| Height of preform (mm) | 62.8 | 82.6 | 62.8 |
| Maximum outside diameter of preform (mm) | 23.6 | 23.6 | 23.6 |
| Minimum inside diameter of preform (mm) | 16.8 | 16.8 | 10.0 |
| PREFORM MOLDING PARAMETERS | | | |
| Injection temperature (° C.) | 215 | 215 | 215 |
| Mold temperature (° C.) | 7° C. | 7° C. | 7° C. |
| Injection time (seconds) | 4.75 | 4.75 | 4.75 |
| Injection pressure (MPa) | 1250 | 800 | 800 |
| STRETCH-BLOW MOLDING PARAMETERS | | | |
| Blow molding temperature (° C.) | 125 | 120 | 120 |
| Blow molding pressure (MPa) | 16 | 16 | 16 |
| Stretch ration axial | 1.9 | 2.4 | 3.8 |
| BOTTLE CHARACTERISTICS Average of 6 Wall Thicknesses (mm) | | | |
| Upper part | 0.29 | 0.30 | 0.28 |
| Middle part | 0.28 | 0.27 | 0.23 |
| Lower part | 0.33 | 0.32 | 0.28 |
| Overall Average Wall Thickness (mm) | 0.30 | 0.30 | 0.26 |

TABLE 3-continued

| Example No. | 3 | 4 | 5 |
|---|---|---|---|
| Standard Deviation | | | |
| Upper part | 0.08 | 0.06 | 0.06 |
| Middle part | 0.07 | 0.07 | 0.03 |
| Lower part | 0.10 | 0.10 | 0.10 |
| Average Standard Deviation | 0.09 | 0.08 | 0.07 |

Conclusions

The wall thickness distribution of the oval bottles as well as the round bottle was considered to be at an acceptable level for production. The specification <0.1, mm standard deviation is applicable. This confirms the possibility to produce oval bottles using 2-step injection stretch blow molding.

EXAMPLES 6 TO 8 AND COMPARISON EXAMPLE 3

In a second further trial, materials were processed on the same 1-liter bottle with a 2-step laboratory scale stretch blow molding machine used for previous trials. Three materials containing different levels of the $Cu_2(OH)PO_4$ were tested, to confirm the effect of the additive and determine the optimum percentage inclusion. A comparison was made with material containing no additive. Three sample materials based upon the same ethylene polymer as in Examples 2 to 5 were used containing three different levels of $Cu_2(OH)PO_4$ i.e. 300 ppm, 500 ppm and 700 pmm. As a comparison a material with zero $Cu_2(OH)PO_4$ is included for reference.

The process conditions are reported in Table 4, and the characteristics of the so obtained bottles are reported in Table 5.

TABLE 4

| | Example No. | | | |
|---|---|---|---|---|
| | 6 | 7 | 8 | Comparison 3 |
| ppm $Cu_2(OH)PO_4$ | 300 | 500 | 700 | 0 |
| PREFORM CHARACTERISTICS | | | | |
| Weight of preform (g) | 35.9 | 35.9 | 35.9 | 35.9 |
| Maximum thickness of preform (mm) | 3.7 | 3.7 | 3.7 | 3.7 |
| Height of preform (mm) | 124 | 124 | 124 | 124 |
| Maximum outside diameter of preform (mm) | 43 | 43 | 43 | 43 |
| Minimum inside diameter of preform (mm) - wall thickness 3.47 mm | 36.06 | 36.06 | 36.06 | 36.06 |
| PREFORM MOLDING PARAMETERS | | | | |
| Injection temperature (° C.) | 230 | 230 | 230 | 250 |
| Mold temperature (° C.) | 15 | 15 | 15 | 15 |
| Injection time (seconds) | 3.99 | 3.97 | 3.97 | 2.01 |
| Injection pressure (MPa) | 927 | 934 | 945 | 74.6 |
| STRETCH-BLOW MOLDING PARAMETERS | | | | |
| Blow molding temperature (° C.) | 119.8 | 120 | 120 | 121 |
| Blow molding pressure (MPa) | 6 | 6 | 6 | 1.1 |
| Stretch ratio 251 mm long | 2.49 | 2.49 | 2.49 | 2.49 |
| Preform Temperature Inside (° C.)[1] | 124 | 124 | 124 | 123 |
| Preform temperature outside (° C.)[1] | 127 | 127 | 127 | 126 |
| Infra-red energy reduction during reheating (%)[2] | 13.3 | 16.5 | 19.18 | — |
| Energy reduction (of total SBM process) (%)[2] | 5.5 | 6.8 | 7.9 | — |
| Scrap rate (%)[3] | 0 | 0 | 0 | 14 |

TABLE 5

| | Example No. | | | |
|---|---|---|---|---|
| | 6 | 7 | 8 | Comparison 3 |
| BOTTLE CHARACTERISTICS | | | | |
| ppm $Cu_2(OH)PO_4$ | 300 | 500 | 700 | 0 |
| Haze (%)[1] | 42.5 | 42.5 | 42.5 | 62.6 |
| Drop test at 22° C.[5] (cm) | >300 | >300 | >300 | >300 |
| Drop test at 4° C.[5] (cm) | >300 | >300 | >300 | >300 |
| Topload (Filled)[6] | | | | |
| First Maximum load (N) | 910 | 951 | 943 | 807 |
| Strain at maximum load (mm) | 8.2 | 8.4 | 8.5 | 8.5 |
| Standard Deviation | 0.42 | 0.45 | 0.47 | 0.37 |
| Improvement In Filled Topload (%) | 13 | 18 | 17 | — |
| BOTTLE CHARACTERISTICS Average of 6 Wall Thicknesses (mm) | | | | |
| Heel | 0.471 | 0.417 | 0.442 | 0.373 |
| Lower Label | 0.443 | 0.407 | 0.407 | 0.336 |
| Middle Label | 0.365 | 0.335 | 0.344 | 0.451 |
| Upper Label | 0.341 | 0.325 | 0.324 | 0.363 |
| Shoulder | 0.293 | 0.286 | 0.281 | 0.595 |
| Upper Shoulder | 0.471 | 0.417 | 0.442 | 0.370 |
| Standard Deviation | | | | |
| Heel | 0.108 | 0.097 | 0.094 | 0.062 |
| Lower Label | 0.082 | 0.073 | 0.075 | 0.044 |
| Middle Label | 0.043 | 0.043 | 0.035 | 0.020 |
| Upper Label | 0.033 | 0.035 | 0.029 | 0.100 |
| Shoulder | 0.028 | 0.027 | 0.024 | 0.100 |
| Upper Shoulder | 0.021 | 0.017 | 0.019 | 0.078 |
| Average Standard Deviation | 0.048 | 0.049 | 0.046 | 0.067 |
| Section Weights (3 sections) | | | | |
| Max-Min weight Spread (g) | 0.33 | 0.27 | 0.46 | 0.74 |
| Mean Section Weight (g) | 11.98 | 11.97 | 11.98 | 12.02 |
| Standard Deviation of Section Weight (g) | 0.13 | 0.07 | 0.16 | 0.27 |

Notes to Tables.
[1]Thermal Camera;
[2]Infra red Lamp Setting to Reach Satifactory Process Conditions;
[3]Precent of bottles with the evident defects;
[4]measured according to ASTM D1003;
[5] and [6]measured according to the "Voluntary Standard Test Methods For PET Bottles" issued in 2004 by International Society of Beverage Technologists.

What is claimed is:

1. An injection stretch blow molding process for preparing polyethylene containers comprising:
   1) preparing a preform by injection molding a polyethylene composition comprising (A) ethylene polymers and a heat absorber (B) comprising 250-1000 ppm $Cu_2(OH)PO_4$;
   2) heating the preform of step 1) to a temperature of 120-135° C. on the inner and outer surfaces of the preform; and 3) stretch blow molding the preform of step 2.

2. The injection stretch blow molding process of claim 1, wherein the preforms prepared in the injection molding step 1) are left to cool to a preform temperature of 25° C. before subjecting them to the stretch blow molding step 3).

3. The injection stretch blow molding process of claim 1, wherein the stretch ratio in step 3) is 2-4.

4. The injection stretch blow molding process of claim 1, wherein the preforms are reheated by means of an infrared source.

5. The injection stretch blow molding process of claim 1, wherein the polymer (A) is an ethylene homopolymer or copolymer comprising a density equal to or greater than 0.945 g/cm$^3$.

6. The injection stretch blow molding process of claim 1, wherein the heat absorber (B) comprises 250-600 ppm $Cu_2(OH)PO_4$.

7. The injection stretch blow molding process of claim 1, wherein the heat absorber (B) comprises 400-1000 ppm $Cu_2(OH)PO_4$.

8. The injection stretch blow molding process of claim 1, wherein the preform in step 1) is injection molded at a temperature of 210-260° C. and a pressure of 25-80 bar.

9. The injection stretch blow molding process of claim 1, wherein the polyolefin container comprises a bottle.

10. The injection stretch blow molding process of claim 1, wherein the polyolefin container exhibits a 50% reduction in haze value versus a polyolefin container lacking the heat absorber.

* * * * *

UNITED STATES PATENT AND TRADEMARK OFFICE
CERTIFICATE OF CORRECTION

PATENT NO. : 10,239,267 B2
APPLICATION NO. : 13/881282
DATED : March 26, 2019
INVENTOR(S) : Rogers et al.

It is certified that error appears in the above-identified patent and that said Letters Patent is hereby corrected as shown below:

In the Specification

In Column 2, Line 59, delete "comomomer(s)" and insert -- comonomer(s) --, therefor
In Column 3, Line 26, delete "stirring" and insert -- stirred --, therefor
In Column 3, Line 47, after "according" insert -- to --

Signed and Sealed this
Nineteenth Day of July, 2022

Katherine Kelly Vidal
*Director of the United States Patent and Trademark Office*